Feb. 2, 1932. E. STERN 1,843,348
TIRE LOCKING MEANS
Filed Oct. 17, 1929
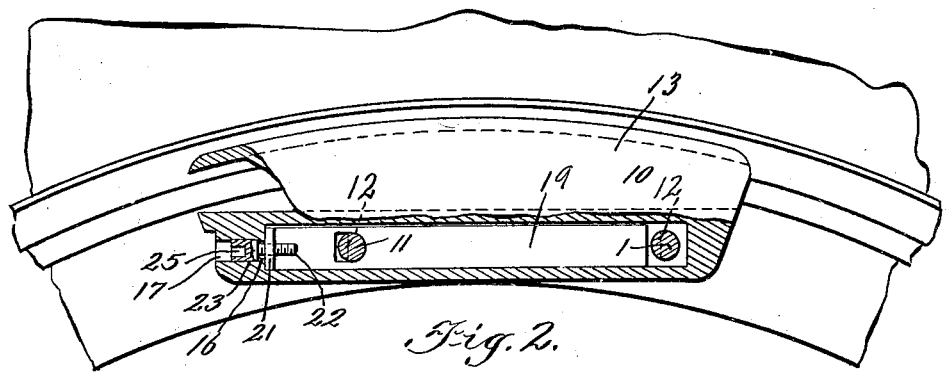
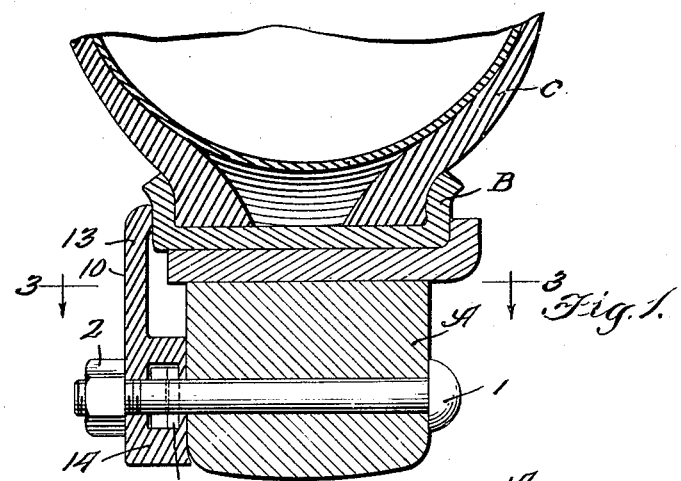
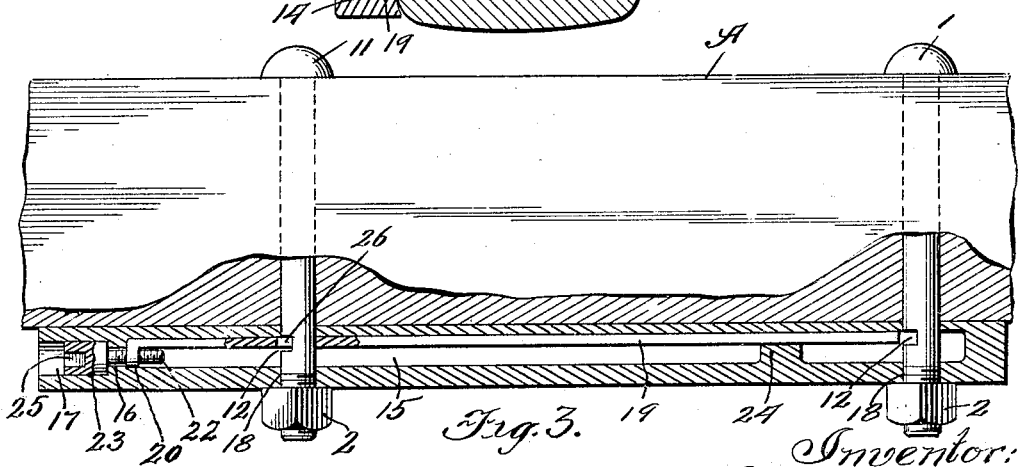
Inventor:
Edward Stern Patented Feb. 2, 1932

1,843,348

UNITED STATES PATENT OFFICE

EDWARD STERN, OF CHICAGO, ILLINOIS

TIRE LOCKING MEANS

Application filed October 17, 1929. Serial No. 400,369.

This invention relates to a novel and improved locking means, and is especially adapted for securely locking a tire on the wheel of an automobile, whereby the same may not be removed by an unauthorized person.

In the conventional constructions of mounting the tires on automobile vehicles the tire is held in place on the wheel by means of a series of bolts passing through the felly of the wheel, said bolts carrying at their free ends a number of clips which are securely held in place by means of nuts threaded on the ends of said bolts. To remove the tire from the wheel these nuts are removed, or loosened, permitting the turning or removal of the clips, and the tire may then be slipped off the wheel. All that is necessary to remove tire, is an ordinary wrench, and because of that there has been a great deal of trouble experienced by automobile owners with tires being stolen from the car when the same is parked on the street at night.

It is the main object of this invention to provide a suitable locking means adapted to be associated with the usual construction of wheel, whereby it will require a special key for the removal of the tire, thereby preventing unauthorized persons from removing the same.

Another object of this invention is to provide a novel and improved means for locking the tire to the wheel of a vehicle, wherein it will require a special key to loosen the holding means for the tire on the wheel, consequently these means can not be loosened by an unauthorized person, said locking means being provided in combination with one or more of the said holding means, the remaining structure of said tire and wheel being not altered or modified in construction.

A further object of the invention is to provide in combination with the usual fastening means for holding a tire in place on a wheel, a locking means having a special key adapted for actuating the same, whereby it will be impossible for unauthorized persons to loosen the same when in locked position.

A still further object of the invention is to provide a novel and improved locking means for holding a tire in place on a wheel of usual construction, said locking means being composed of few and simple parts, which may be readily and easily manufactured and assembled along lines convenient for low cost manufacturing and which will be compact and neat in appearance, simple in operation, and highly efficient in carrying out the purposes for which it is designed.

A still further object of the invention is to provide in combination with one or more of the clips used for holding a tire in place on the wheel of a vehicle, a novel locking means requiring a special key for loosening and locking the same, whereby when once the tire has been locked in place on the wheel it will require the use of said special key to loosen the same, consequently it can not be loosened by an unauthorized person, said locking means being made integral with and a part of one or more of said clips, and is adapted for attachment and use without necessitating the alteration or modification of the structure of the tire or wheel.

With the foregoing and other objects in view, which will appear as the description proceeds, the invention consists in certain novel features of construction, arrangements, and combination of parts, hereinafter more fully described, illustrated in the accompanying drawings and particularly pointed out in the appended claims, it being understood that various changes in the form, proportion, size, and minor details of the structure may be made without departing from the spirit or sacrificing any of the advantages of the invention.

Stated generally, the invention comprises a change in the construction in one or more of the clips now used for holding the tire of a vehicle in place on the wheel, whereby it will be impossible to remove or turn said clip even after said nuts holding said clips in place have been removed. The special clip is held in locked position by a special locking means adapted for engagement with the usual bolts, and can be loosened only by the use of a special key.

The conventional construction of wheel and tire holding means remains unaltered, as well as most of the clips, there being required a change in the construction of one or, if desired only two of the clips. In the preferred embodiment shown which is only one of several locking means that may be employed for the purpose, one of the clips is made somewhat wider in width and is adapted to be received over a pair of spaced bolts, having slots cut in their body portions. The clip is provided with a longitudinally disposed sliding plate member, which is adapted when in withdrawn or unlocked position to permit the clip to be mounted on or removed from its bolts, but when moved to its locking position, will prevent the turning or removal of the clip from its bolts. The said sliding plate member has one end thereof threaded on a screw or stud having a head in which is provided a recess of any desired shape for receiving a special key. The turning of the stud will cause a sliding movement of the plate member in the desired direction and will move the same either out of or into engagement with the slots provided in the bolts. Thus when the tire has been disposed in place on the wheel in the usual manner, the usual clips as well as the special clip will be securely fastened in place by the usual nuts provided for this purpose on the ends of said bolts. In addition to this the special clip will be further locked in place by the turning of the stud to move the said plate member into locking engagement with its corresponding bolts. To remove the tire, not only do all of the nuts have to be removed, but in addition to that the stud must be rotated in the proper direction to cause a withdrawal of the plate member, which can only be done by the special key, consequently the special clip cannot be removed by an unauthorized person. Obviously any number of these special clips may be employed, but in practice it will be found that if said special clip is disposed at a point on the wheel substantially opposite that to the tire valve, only one of such clips will be necessary to prevent the unauthorized removal of the tire.

For the purpose of facilitating an understanding of my invention I have illustrated in the accompanying drawings, a preferred embodiment thereof, from an inspection of which, when considered in connection with the following description, my invention, its mode of construction and operation, and many of its advantages should be readily understood and appreciated.

Referring to the drawings, in which similar characters of reference are employed to indicate corresponding parts throughout the several figures of the drawings:

Fig. 1 is a transverse sectional view through the wheel and a portion of the tire showing a clip embodying the present invention used for locking the tire in place on the wheel;

Fig. 2 is a front elevational view of said clip, parts thereof being broken away to show the locking means therefor; and Fig. 3 is a view taken on line 3—3 of Fig. 1, looking in the direction of the arrows, parts thereof being broken away to show the locking means associated with said clip.

Referring to the drawings more specifically by characters of reference, the letter A, designates the felly of a conventional form of automobile wheel, and the letter B, designates the conventional form of rim upon which the tire C, is mounted. The tire with its rim is mounted as a unit on the wheel, and heretofore has been securely locked in place on the wheel by means of a plurality of bolts 1, extending through the felly, and carrying at their free ends clips, which clips are held in place by means of suitable nuts 2, threaded on the free ends of said bolts. To remove the tire, the nuts may either be entirely removed, or just loosened and the clips turned to be moved out of engagement with the rim B, whereby the tire and rim will then be free to be dismounted from the wheel. As the above construction forms no part of the present invention, it is thought not necessary to describe the same more in detail.

To prevent the unauthorized removal of the tire from the wheel, I provide in place of one or more of the usual clips, a special clip generally designated by the reference character 10. Also in addition to the bolts 1, already provided on the wheel, I provide an additional bolt 11, for every one of the special clips to be used. This additional bolt is spaced only a short distance from one of the bolts 1, the distance depending upon the width of the special clip, as the latter is adapted to span the distance between the said bolts. The bolt 11, and its adjacent bolt 1, is provided adjacent its free end with a radial slot 12, said slots facing in the same direction on the two bolts, and being disposed, when the bolts are in operating position, in the same plane, as clearly shown in Fig. 3, of the drawings. The bolt 11, like the bolts 1, is threaded on its free end and is adapted to receive thereon in threaded relation a nut 2, said nut together with the nut provided on the free end of the bolt 1, securely hold the tire and rim in place on the wheel in the usual and well known manner, it is to be understood that the locking means associated with the clip 10, to be presently described, being additional to the nuts 2.

The special clip 10, comprises the upper portion 13, and the lower and substantially thicker portion 14, said lower portion extending upwardly to a point near the center of the said clip. As stated before the said clip is of substantial width, which width may vary from three to four or maybe five inches, at any event it is adapted to span the distance between the two adjacent bolts 1, and 11, as shown in the drawings. The lower portion 14, of the clip 10, is provided with a longitudinally disposed recess or cavity 15, one end of which is closed by the end wall of the clip 10, and the other end of which is in communication through an opening 16, of reduced diameter, with a recess 17, provided in the other end of the lower portion 14, of the clip. Disposed within the recess 15, which extends along substantially the full width of the clip 10, is a flat plate member 19, said plate member extending from a point just adjacent the inner edge of the opening 16, to a point immediately adjacent the wall of the bolt 1, as viewed in Fig. 3, of the drawings. Suitable spaced openings 18, are provided in the lower portion of the clip 10, for the passage of the bolts 1, and 11, and a similar opening 26, is provided in the plate member 19, intermediate the ends thereof for the passage of the bolt 11, therethrough. Since the plate member 19, is shorter in length than the recess 15, it will be adapted for sliding movement therein, the means for causing said sliding movement will now be described.

The end of the plate member 19, adjacent the opening 16, is provided with a right angled flange 20, said flange having provided therein a central threaded opening 21, in which is adapted to be received for threaded engagement therein a screw or stud 22, said stud passing through the opening 16, and being provided with a head 23, of increased diameter, which head is adapted for disposition within the recess 17, as shown in Figs. 2, and 3, of the drawings. The head 23, is adapted for rotary movement within the recess 17, but not for sliding movement therein. The plate 19, is held in the same vertical plane in its movement, which is the same plane within which the slots 12, lie, by means of the projection 24, and flange 20.

When the plate member 19, is in its withdrawn position as shown in Fig. 3, of the drawings, the said plate is out of engagement with the bolts 1, and 11, and upon the removal of the nuts 2, the said clip 10, may be readily removed. However, when the plate 19, is in the position shown in Fig. 3, and the nuts 2, are in place on the bolts securely holding the clip 10, in place, the stud 22, may be rotated in the proper direction to cause the plate to move to the right, as viewed in Fig. 3, in which position, the end of the plate will engage within the slot 12, of the bolt 1, and one edge of the opening 26, will engage within the slot 12, of the bolt 11, and when in that position, the clip will still be securely locked to the wheel, even after the removal of the nuts 2.

To prevent the stud 22, from being actuated by an unauthorized person, the head 23, thereof is provided with a recess 25, in its outer end, access to which may be had through the recess 17, the recess 25, may be of various shapes and sizes, whereby a special key will be required for reception within the recess 25, in order to actuate the said stud 22, consequently the said stud 22, cannot be actuated by an unauthorized person. A suitable key having a projection to correspond in shape and size to the recess 25, may be provided for operating the stud 22, said projection may be disposed at right angles to the shank of the key, whereby the same may be operated with ease.

It will be noted that by the provision of the special clip of applicant, the tire and rim can not be removed from the wheel even after the nuts holding the usual clips have been removed, and in view of the special key required for removing or loosening the special clip, the said clip can not be removed by anyone except one who is authorized to do so. Thus it will be seen that the device of the present invention provides a neat, compact and highly efficient anti-theft mechanism for tires carried on the wheels of vehicles, and this is accomplished without the necessity of altering or in any way modifying the conventional construction of wheel or tire and rim.

It is believed that my invention, its mode of construction, and assembly and operation, and many of its advantages, should be readily understood from the foregoing, without further description, and should also be manifest that while a preferred embodiment of the invention has been shown and described for illustrative purposes, the structural details are nevertheless, capable of wide variation within the purview of my invention as defined in the appended claims.

What I claim and desire to secure by Letters Patent of the United States, is:—

1. The combination with a vehicle wheel having a demountable rim mounted thereon by means of a plurality of detachable clips held in place by bolts and nuts; of means associated with at least one of said clips for preventing the unauthorized removal thereof, said means comprising a member slidably mounted in a recess provided in said clip, and being adapted for engagement with the bolt holding said clip, and key controlled means for actuating said slidable member to move it into and out of operative engagement with said bolt.

2. The combination with a vehicle wheel having a demountable rim mounted thereon by means of a plurality of detachable clips held in place by bolts and nuts; of means associated with one of said clips for preventing the unauthorized removal thereof, said means comprising a member slidably mounted in a recess provided therefor in said clip, said member having a projection adapted for engagement within a slot provided therefor in said bolt holding said clip in place, and key controlled means for actuating said slidable member to move the same into and out of engagement with said bolt.

3. The combination with a vehicle wheel having a demountable rim mounted thereon by means of a plurality of clips detachably held in place by bolts and nuts; of means associated with one of said clips for preventing the unauthorized removal thereof, said means comprising a member slidably mounted in a recess provided in said clip, said member having a projection adapted for engagement within a radial slot provided in the bolt passing through said clip, a right angled portion provided on one end of said slidable member, and a stud having a threaded body portion and a head portion, said threaded portion extending through the end wall of the recess and into threaded engagement with the right angled portion of the slidable member, whereby rotation of the stud will cause a sliding movement of the slidable member.

In testimony whereof I affix my signature.

EDWARD STERN.